(12) United States Patent
Eaton et al.

(10) Patent No.: US 7,066,591 B2
(45) Date of Patent: Jun. 27, 2006

(54) ANALOG ENCODER

(75) Inventors: William S. Eaton, Vancouver, WA (US); Steven E. Soar, Vancouver, WA (US); Ngoc-Diep Nguyen, Portland, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 95 days.

(21) Appl. No.: 10/779,074

(22) Filed: Feb. 14, 2004

(65) Prior Publication Data

US 2005/0179717 A1    Aug. 18, 2005

(51) Int. Cl.
*B41J 2/01* (2006.01)
(52) U.S. Cl. ...................................... 347/101
(58) Field of Classification Search ................ 702/158; 341/111
See application file for complete search history.

(56) References Cited

U.S. PATENT DOCUMENTS

| | | | |
|---|---|---|---|
| 4,194,184 A | 3/1980 | Hartmann et al. | |
| 4,318,617 A | 3/1982 | Orsen | |
| 4,390,865 A | 6/1983 | Lauro | |
| 4,862,396 A * | 8/1989 | Nirumandrad | 702/158 |
| 4,901,255 A | 2/1990 | Lynn et al. | |
| 5,406,077 A | 4/1995 | Aoki et al. | |
| 6,292,117 B1 | 9/2001 | Smith | |
| 6,396,052 B1 | 5/2002 | Barry et al. | |
| 6,452,512 B1 | 9/2002 | Adkins et al. | |
| 6,525,837 B1 | 2/2003 | Adkins et al. | |
| 6,555,809 B1 | 4/2003 | Kenjo et al. | |
| 6,556,153 B1 * | 4/2003 | Cardamone | 341/111 |
| 6,600,150 B1 | 7/2003 | Adkins et al. | |
| 6,660,996 B1 | 12/2003 | Adkins et al. | |

FOREIGN PATENT DOCUMENTS

DE          4225081          2/1993

OTHER PUBLICATIONS

European Search Report dated Jun. 14, 2005.

* cited by examiner

*Primary Examiner*—K. Feggins

(57) ABSTRACT

An analog encoder of one embodiment of the invention is disclosed that includes an input mechanism, a digital signal processing mechanism, and an output mechanism. The input mechanism is to receive and digitize different analog encoder signals. The digital signal processing mechanism is to generate inverse analog encoder signals from the different analog encoder signals, and to apply dynamically changeable gain and offset corrections in real-time. The output mechanism is to generate digital quadrature signals from crossing points among the analog encoder signals and the inverse analog encoder signals, and a position value based on a direction of the digital quadrature signals for external access.

20 Claims, 6 Drawing Sheets

ANALOG ENCODER

BACKGROUND

Many image-forming devices, especially fluid-ejection devices like inkjet-printing devices, form images on media on a media swath-by-media swath basis. For instance, an inkjet printer may move an inkjet printhead over a current swath of media, where the printhead ejects ink as it moves over the swath to form one swath of the image on the media. The media is then usually advanced so that the next swath of media is under the printhead, and the printhead moves over and ejects ink onto this new current media swath. This process is repeated until ink has been ejected onto nearly all the media swaths of a given sheet of media, to completely form an image on the media.

For image quality reasons, advancement of the media within the image-forming device is usually precisely controlled. Encoder signal generators may be used that provide signals based on how much the media has been advanced. That is, the generators sense mechanical motion and translate such motion into signals. However, there are various sources of error associated with encoders that can affect the accuracy with which position of the media can be determined.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the embodiments of the invention. Other embodiments may be utilized, and logical, mechanical, and other changes may be made without departing from the spirit or scope of the appended claims. The following detailed description is, therefore, not to be taken in a limiting sense, and the scope of the present invention is defined only by the appended claims.

Encoder-oriented Signals

Figure 1:
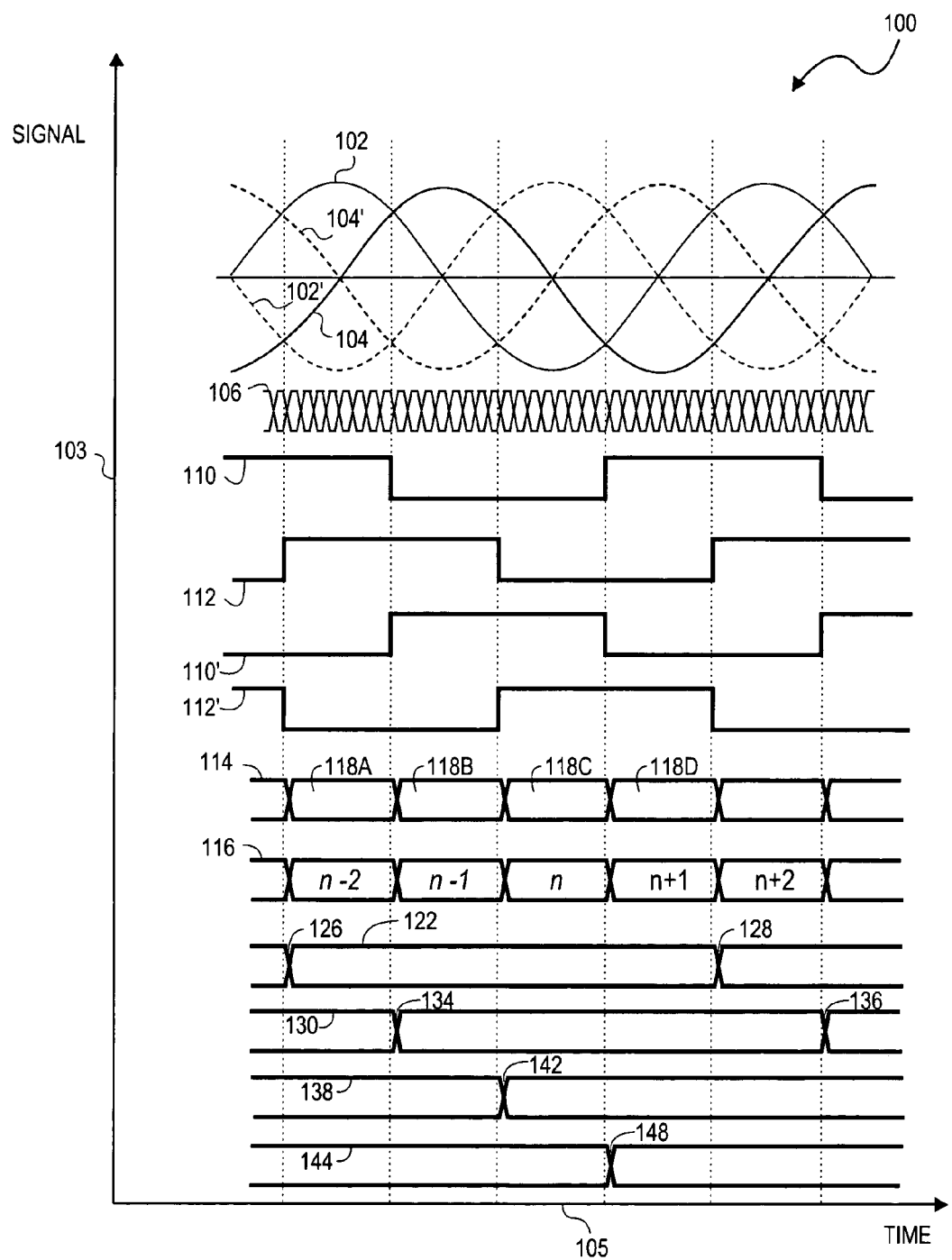
FIG. 1 is a graph depicting various examples of encoder-oriented signals, according to an embodiment of the invention.

FIG. 1 shows a graph 100 of examples of various encoder-oriented signals, according to an embodiment of the invention. The y-axis 103 denotes the value of the signals as a function of time on the x-axis 105. At the top of the graph 100 are superimposed two encoder signal generator signals 102 and 104. The signals 102 and 104 are analog signals, resulting from an encoder signal generator sensing motion, such as motion of media being advanced through an image-forming device, and generating the signals 102 and 104 in response. Each of the signals 102 and 104 can be considered a separate encoder signal channel. The signal 102' is the inverse of the signal 102, and the signal 104' is the inverse of the signal 104. The signals 102' and 104' are dotted in FIG. 1 for illustrative clarity, and are also analog signals. However, they are not actually generated within the analog encoder, but rather are depicted for informative purposes.

The signal 106 is a digital signal that is generated based on the analog signals 102 and 104. That is, the signal 106 represents four digital values that represent time synchronized amplitude measurements of the two encoder signals 102 and 104 and the inverse of these signals 102' and 104'. In particular, the signal 106 represents digitized versions of the signals 102 and 104, as well as digitized versions of the signals 102' and 104'. Because the signals 102' and 104' are not actually generated by the analog encoder, digitized versions of them are actually generated from the digitized versions of the signals 102 and 104 in one embodiment of the invention.

The signals 110, 112, 110', and 112' are digital quadrature signals, which indicate when quadrature crossing point states are detected within the four digital encoder value represented by signals 106. Quadrature can be generally defined as a description of the ninety-degrees out-of-phase relationship between two encoder signal generator channels. Generally, the signal 110' is the inverse of the signal 110, and the signal 112' is the inverse of the signal 112. However, in actuality, the signals 110' and 112' may not be perfectly the inverses of the signals 110 and 112, due to imperfections within the encoder, encoder device, encoder sampling mechanisms, and noise in the system. The edges of signal 110 correspond to the crossing points generated when the magnitude of the signal 104' is greater than the magnitude of the signal 102'. Similarly, the signal edges of signal 112 correspond to crossing point events generated when the magnitude of the signal 102 is greater than the magnitude of the signal 104'. Similarly the signal 110' is generated from the crossing points of signals 104 and 102 and signal 112' is generated by using the crossing point events of signals 102' and 104. In this preferred embodiment, the signals 102' and 104' and the output signals 110' and 112' do not physically exist. These signals are shown for clarity only. The four signals represented by signal 106 are physical signals that are used to calculate the crossing point events discussed above.

A quadrature encoding system includes 4 discrete conditions or states that can be decoded for the crossing point event data. These states can also be decoded easily form the signals 110, 110', 112, 112'. This state value is represented by the signal 114. The value of the signal 114 corresponds to the four described quadrature states and are represented by values, or quadrature states, 118A, 118B, 118C, and 118D within the signal 114. Collectively these values are referred to as the quadrature states 118. The quadrature states 118 are defined based on the crossing point events decoded from the signal 106 values and represented by the edge events of the signals 110, 112, 110', and 112'. The quadrature states 118 are defined in succession, such that the state 118B follows the state 118A, the state 118C follows the state 118B, the state 118D follows the state 118C, and the state 118A follows the state 118D, in one direction. In the other direction, the state 118A follows the state 118B, the state 118B follows the state 118C, the state 118C follows the state 118D, and the state 118D follows the state 118A.

The quadrature state 118A is defined as occurring when both the signal 112 and 110 are high, and thus can be represented as the binary state 0x11. The quadrature state 118A is present when logically AND'ing the signals 110 and 112 yields high. The quadrature state 118B is defined as occurring when the signal 112 is still high and the signal 110 is low, and thus can be represented as the binary state 0x10. The quadrature state 118B is present when logically AND'ing the signal 112 and the signal 110'—which is the inverse of the signal 110—yields high. The quadrature state 118C is defined as occurring when both the signals 112 and 110 are low, and thus can be represented as the binary state 0x00. The quadrature state 118C is present when logically AND'ing the signals 110' and 112'—which are the inverses of the signals 110 and 112—yields high. Finally, the quadrature state 118D is defined as occurring when the signal 112 is still low and the signal 110 is high, and thus can be represented as the binary state 0x01. The quadrature state 118D is present when logically AND'ing the signal 110 and the signal 112'—which is the inverse of the signal 112—yields high.

The signal 116 represents a running position count of the encoder system. This value is incremented or decremented each time a quadrature state change event is detected. The direction of the quadrature state change event determines whether the value of the signal 116 is incremented or decremented. In the embodiment disclosed, a state transition in the sequence of state 118A to state 118B, state 118B to state 118C, state 118C to state 118D, or state 118D to state 118A, is defined to increment the value of the signal 116. Conversely quadrature state transitions in the sequence of state 118A to state 118D, state 118D to state 118C, state 118C to state 118B, or state 118B to state 118A are defined to decrement the value of the signal 116. Quadrature state transitions that are not included in the two lists presented are undefined events, due to the nature of how quadrature encoded systems function.

At least some embodiments of the present invention include the capability to automatically correct for encoder signal variations caused by a number of various sources. The signals 122, 130, 138, and 144 are four signals that are calculated from the four values of the signal 106, the current quadrature state value represented by signal 114, and the detected crossing point events represented by the edges of signals 110, 110', 112, and 112'. Each time a crossing point event is detected one or more of signals 122, 130, 138, or 144 will be loaded with a specific value form the four signal 106 values. There are actually 8 total crossing point magnitude values and each value is loaded based on a unique quadrature state value but in time they can be represented by just the four signals 122, 130, 138, and 144. These eight crossing point magnitude values are used to track the peak-to-peak amplitude of the encoder signals 102 and 104. This capability allows the system to automatically adjust the gain of the system and adjust the relationship between the value of the 106 signal values and actual position in the system. This capability of auto gain adjustment enables at least some embodiments of the invention to achieve a desirable level of overall accuracy of the system and make the system tolerate a number of error conditions that can occur in these types of systems.

The crossing point magnitude value of the signal 122 latches the value of signal 106 that corresponds to signal 102 and 104 when the crossing point event represented by the either the rising or falling edge event of signal 112 but only when signal 110 is high. These events are marked by reference numbers 126 and 128 of FIG. 1. Similarly, the crossing point magnitude value of the signal 130 latches the value of signal 106 that corresponds to signal 104 and 102' when the crossing point event represented by the either the rising or falling edge event of signal 110' but only when signal 112 is high. These events are marked by reference numbers 134 and 136 of FIG. 1. The crossing point magnitude value of the signal 138 latches the value of signal 106 that corresponds to signal 102' and 104' when the crossing point event represented by the either the rising or falling edge event of signal 112' but only when signal 110' is high. These events are marked by crossing point 142 of FIG. 1. Finally, the crossing point magnitude value of the signal 144 latches the value of signal 106 that corresponds to signal 102 and 104' when the crossing point event represented by the either the rising or falling edge event of signal 110 but only when signal 112' is high. These events are marked by crossing point 148 of FIG. 1.

An additional set of signal values that are derived in this system that contribute to system accuracy and performance are the peak detection latches. These latches and the values output by them are not represented in FIG. 1. However, these latches capture the maximum and minimum values of the 106 signal values that correspond to the signals 102 and 104. There are 2 values latched for signal 102 that correspond to the maximum and minimum values of signal 102. Similarly there are an additional 2 values for the 104 signal values that latch the maximum and minimum values detected on this signal. The 4 resultant values are used to enable realtime gain and offset control of the encoder system's calculation of the four 106 values and reduce the effect of another set of error conditions from the systems ability to accurately manage a positioning system.

Example Image-forming Device

Figure 2:
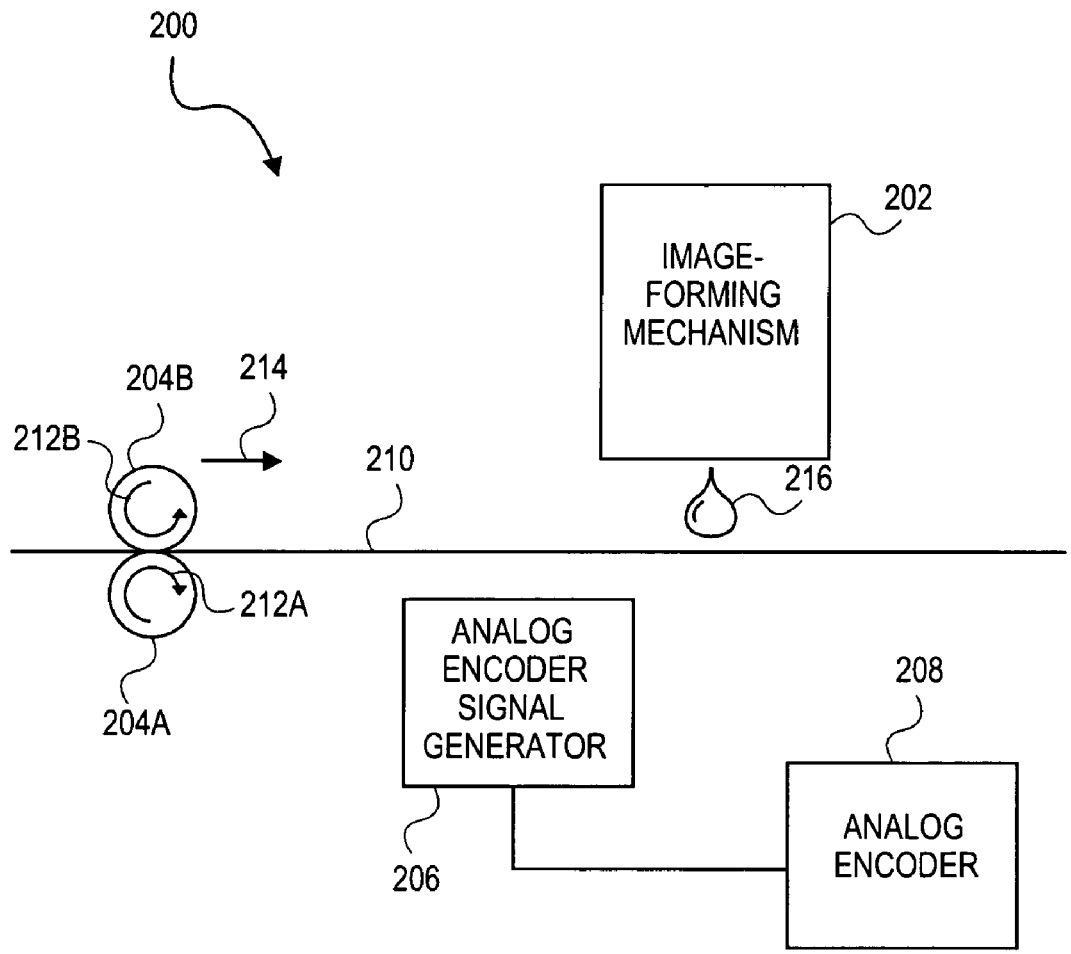
FIG. 2 is a diagram of an example image-forming device, according to an embodiment of the invention.

FIG. 2 shows an example image-forming device 200, according to an embodiment of the invention. The image-forming device 200 includes an image-forming mechanism 202, a media-moving mechanism made up of rollers 204A and 204B, an analog encoder signal generator 206, and an analog encoder 208. As can be appreciated by those of ordinary skill within the art, the image-forming device 200 may include components in addition to and/or in lieu of those depicted in FIG. 2.

The image-forming mechanism 202 is depicted in FIG. 2 as specifically being a fluid-ejection mechanism, such as one or more inkjet printheads, that eject fluid 216, such as ink, onto the media 210, as the media 210 moves from left to right under the image-forming mechanism 202, as indicated by the arrow 214. The image-forming mechanism 202 may be a scanning-type mechanism, in which it moves back and forth over a media swath that is currently under the mechanism 202. In FIG. 2, this means that the mechanism 202 moves into and out of the plane of the page, over the media 210. Once a media swath has fluid ejected onto it, the media is advanced so that a new swath of media is under the mechanism 202. Where the mechanism 202 is an inkjet-printing mechanism, such as including one or more inkjet printheads, then the device 200 is an inkjet-print device. However, the mechanism 202 may be a type of image-forming mechanism other than a fluid-ejection mechanism as well. In general, the image-forming mechanism 202 forms images on the media 210.

The media-moving mechanism 204 moves the media 210 through the image-forming mechanism 202. In the case of FIG. 2, the mechanism 204 more particularly moves the media 210 under the image-forming mechanism 202. As shown in FIG. 2, the media-moving mechanism 204 can in one embodiment include two rollers 204A and 204B that rotate in the directions indicated by the arrows 212A and 212B, respectively. The rotation of the rollers 204A and 204B cause the media 210 to be moved in the direction 214.

The analog encoder signal generator 206 generates analog encoder signals, based on the movement of the media 210. For instance, the generator 206 may generate the signals 102, 104, and/or 106 that have been described in relation to FIG. 1. The generator 206 may be an encoder wheel, or another type of analog encoder signal generator. The generator 206 is an analog encoder signal generator because the signals that it generates are analog encoder signals, as opposed to, for instance, digital encoder signals. Furthermore, the generator 206 may include more than one channel of analog encoder signals, or the generator 206 may actually be two or more generators, each of which generates one or more channels of analog encoder signals.

In response, the analog encoder 208, which is communicatively connected to the generator 206, generates at least a position value, such as the values of the signals 116 and/or 106 of FIG. 1, which correspond to a position of the media 210 relative to the image-forming mechanism 202. The analog encoder 208 generates this position value based on the analog encoder signals generated by the generator 206, in a way that reduces the likelihood of quadrature-state positioning errors and quadrature table-crossing errors, as is described in more detail in later sections of the detailed description. The encoder 208 is an analog encoder because it determines the position and other values from analog encoder signals, as received from the analog encoder signal generator 206. That is, the signals received from the generator 206 are not digital, but analog.

Analog Encoder

Figure 3:
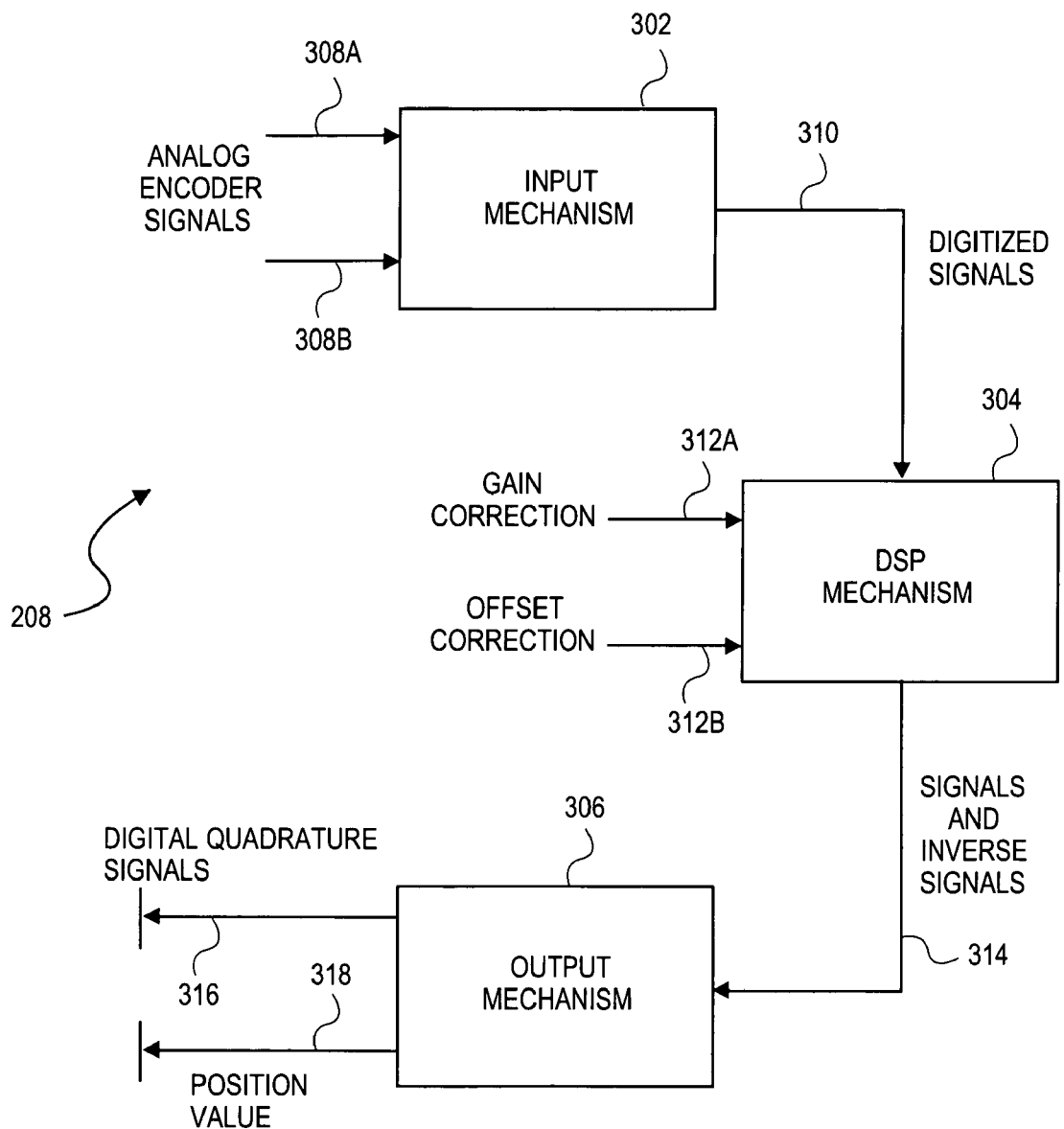
FIG. 3 is a block diagram of an embodiment of an analog encoder, according to an embodiment of the invention.

FIG. 3 shows a block diagram of an embodiment of the analog encoder 208, according to an embodiment of the invention. The analog encoder 208 is depicted in FIG. 3 as including an input mechanism 302, a digital signal processor (DSP) mechanism 304, and an output mechanism 306. As can be appreciated by those of ordinary skill within the art, the encoder 208 may include components in addition to and/or in lieu of those depicted in FIG. 3. The mechanisms 302, 304, and 306 include hardware and/or software components to perform their respective functionalities, as are now described.

The input mechanism 302 receives at least two channels of analog encoder signals 308, as denoted in FIG. 3 as the signals 308A and 308B. The signals 308 may be the signals generated by the analog encoder signal generator 206 of FIG. 2, and may be the signals 102, 104 of FIG. 1. The input mechanism 302 at least digitizes the analog encoder signals 308 to result in the digitized analog encoder signals 310, which are conveyed to the DSP mechanism 304. The input mechanism can also include analog amplification and noise reduction functions as these can improve the systems accuracy but they are not required.

The DSP mechanism 304 at least applies a dynamically changeable gain correction 312A and a dynamically changeable offset correction 312B to the digitized signals 310, and also generates an inverse version of the signals 310, as have been corrected, resulting in the signals 314. The gain correction 312A and the offset correction 312B may be independently applied to any of the signals 310, and further there may be a separate correction 312A and a separate correction 312B for each of the signals 310. The corrections 312 are what allow the analog encoder 208 to reduce the likelihood of quadrature state-positioning errors and quadrature table-crossing errors. The signals 314 of FIG. 3 may correspond to signals 106 of FIG. 1.

In particular, for the desired quadrature table crossing, the signals 310 desirably have the same or substantially the same peak-to-peak amplitude. For instance, the signals 110 and 112 in FIG. 1 desirably have the same or substantially the same peak-to-peak amplitude. If any of the signals 310 has a peak-to-peak amplitude that is less than or greater than a desired peak-to-peak amplitude, the DSP mechanism 304 may apply the gain correction 312A so that this problem is substantially corrected.

Furthermore, the signals 310 desirably have the same average value to detect crossing point events in the desired fashion. For instance, the signals 110 and 112 in FIG. 1 desirably are centered on the same value with respect to one another. If any of the signals 310 is not properly centered with respect to the other of the signals 310, the DSP mechanism 304 may apply the offset correction 312B to shift one or the other signal up or down with respect to the other signals.

Applying correction so that the signals 310 are properly sized and properly aligned allows for quadrature crossing errors to be at least substantially reduced, because the proper size and proper alignment of these signals provides that they will cross at the appropriate times, such that the resulting quadrature signals are generated at the appropriate times. The corrections 312 may be dynamically changed, so that as errors develop or abate within the signals 308 and 310, the corrections 312 may be modified. The corrections 312 are further applied in real-time.

The signals and inverse signals 314 that are output by the DSP mechanism 304 thus can be the signals 106 of FIG. 1, where these signals have been corrected by the gain correction 312A and the offset correction 312B. The signals 314 are received by the output mechanism 306. The output mechanism 306 generates digital quadrature signals 316 from crossing points among the analog encoder signals 308 as have been processed to become the signals 310 and then the signals 314. The output mechanism 306 also generates a position value 318 for external access.

The digital quadrature signals 316 may thus be the digital quadrature signals 114 of FIG. 1. The output mechanism 306 may generate the crossing magnitude signals 122, 130, 138, and/or 144 of FIG. 1. Additionally the output mechanism may provide the digital position value as represented by the signal 116 of FIG. 1, the analog position values as represented by the 4 signal values of signal 106 of FIG. 1 and the peak magnitude values of signals 106 corresponding to signals 102 and 104 of FIG. 1.

Figure 4:
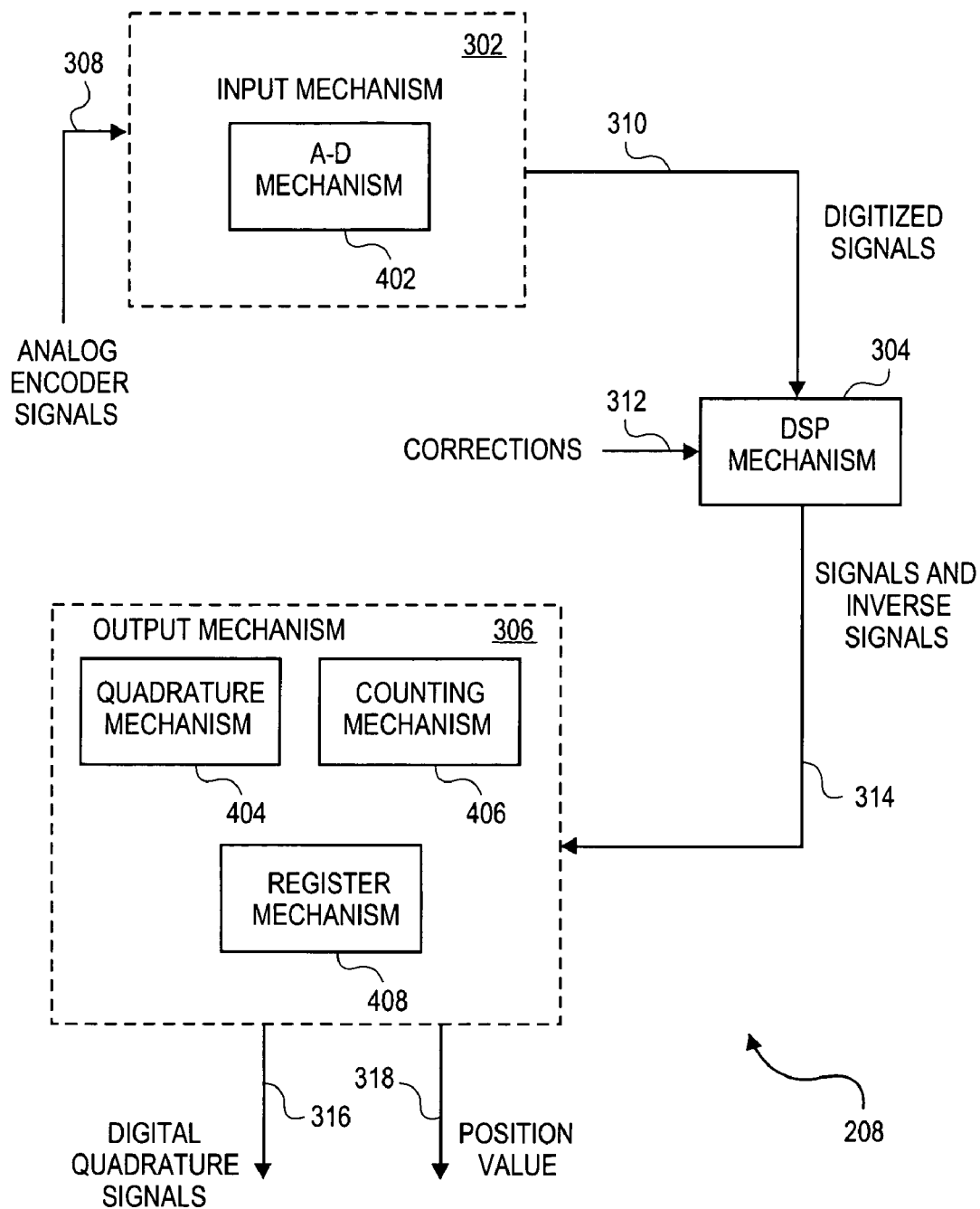
FIG. 4 is a block diagram of an embodiment of an analog encoder that is more detailed than but consistent with that of FIG. 3, according to an embodiment of the invention.

FIG. 4 shows an embodiment of the analog encoder 208 in more detail than, but consistent with, FIG. 3, according to an embodiment of the invention. In FIG. 4, the input mechanism 302 and the output mechanism 306 of the analog encoder 208 are particularly depicted in more detail. The analog encoder signals 308 in FIG. 4 are inclusive of the signals 308A and 308B in FIG. 3, whereas the corrections 312 in FIG. 4 are inclusive of the corrections 312A and 312B in FIG. 3. The input mechanism 302 is shown in FIG. 4 as including an analog-to-digital (A-D) mechanism 402, whereas the output mechanism 306 is shown in FIG. 4 as including a quadrature mechanism 404, a counting mechanism 406, and a register mechanism 408. The mechanisms 402, 404, 406, and 408 include those components to perform their respective functionalities. The analog encoder 208 may include other components, in addition to and/or in lieu of those depicted in FIG. 4.

The A-D mechanism 402 of the input mechanism 302 is that which digitizes the analog encoder signals 308, to result in the digitized signals 310. The quadrature mechanism 404 of the output mechanism 306 generates the digital quadrature signals 316 from the crossing points among the analog encoder signals and their inverse signals, as have been digitized and corrected by the DSP mechanism 304, and input into the output mechanism 306 as the signals 314. The counting mechanism 406 of the output mechanism 306 generates and maintains the position value 318, based on the direction in which the quadrature states among the quadrature signals 316 are moving, and/or based on the position value signals that may be part of the signals 308, as digitized and corrected by the DSP mechanism 304 and input into the output mechanism 306 as the signals 314. The register mechanism 408 of the output mechanism 306 specifically stores at least the digital quadrature signals 316 and the position value 318, as generated by the mechanisms 404 and 406, for external access thereto.

Figure 5:
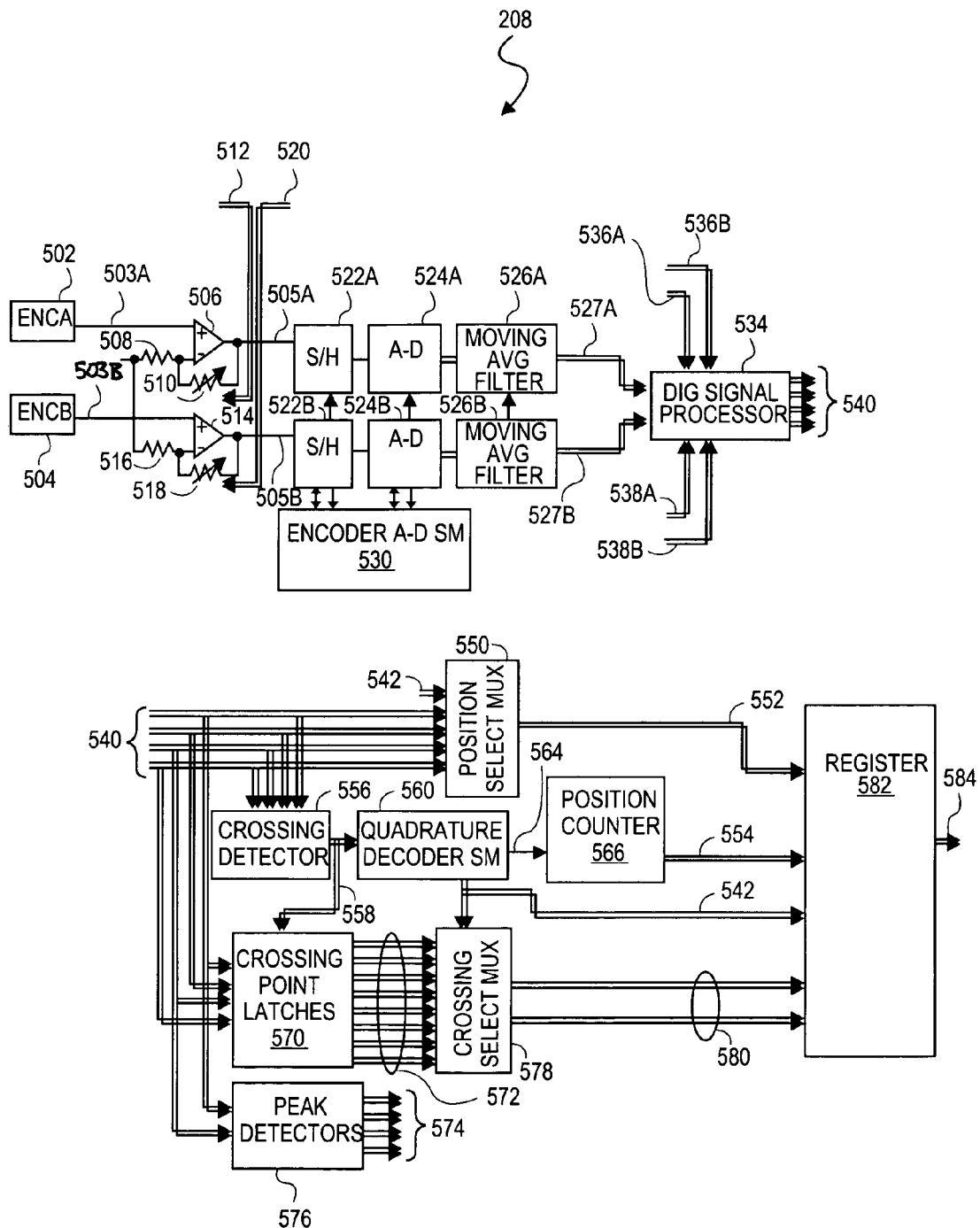
FIG. 5 is a diagram of an embodiment of an analog encoder that is more detailed than but consistent with those of FIGS. 3 and 4, according to an embodiment of the invention.

FIG. 5 shows an embodiment of the analog encoder 208 in more detail than, but consistent with, FIGS. 3 and 4, according to an embodiment of the invention. The analog encoder generator channels 502 and 504 generate two analog encoder signals 503A and 503B, which correspond to the signals 308A and 308B in FIGS. 3 and 4. A first analog amplifier, made up of an operational amplifier (op amp) 506, a fixed resistor 508, and a variable resistor 510 having its value set by an input 512, amplifies the encoder signal 503A in the analog domain. Similarly, a second analog amplifier, made up of an op amp 514, a fixed resistor 516, and a variable resistor 518 having its value set by an input 520, amplifies the encoder signal 503B in the analog domain.

The amplified signals 505A and 505B are input into sample-and-hold mechanisms 522A and 522B, which concurrently sample the signals 505A and 505B based on a signal received from an encoder A-D state machine 530. Once the signals 505A and 505B have been sampled, they are converted from analog to digital by the A-D converters 524A and 524B, and are passed through moving average filters 526A and 526B to reduce noise within the signals. The encoder A-D state machine 530 controls the sample-and-hold mechanisms 522A and 522B, as well as the A-D converters 524A and 524B. The analog amplifiers, the sample-and-hold mechanisms 522A and 522B, the A-D converters 524A and 524B, the moving average filters 526A and 526B, and the encoder A-D state machine 530 can be considered the A-D mechanism 402 of FIG. 4 in one embodiment. The output signals 527A and 527B from the filters 526A and 526B correspond to the signals 310 of FIG. 4, and are input the DSP 534.

The DSP 534 has a dynamically adjustable offset correction input 536A and a dynamically adjustable gain correction input 538A for the signal 527A, as well as a dynamically adjustable offset correction input 536B and a dynamically adjustable gain correction input 538B for the signal 527B. The inputs 536A, 538A, 536B, and 538B are independently controllable, and correspond to the corrections 312 of FIG. 4. The DSP mechanism 304 of FIG. 4 is inclusive of the DSP 534 and the inputs 536A, 538A, 536B, and 538B. The DSP 534 applies the gain and offset corrections provided on the inputs 536A and 538A to the signal 527A, and the gain and offset corrections provided on the inputs 536B and 538B to the signal 527B. The DSP 534 also generates the inverses of the signals 527A and 527B. The result is the signals 540, which correspond to the signals 314 of FIG. 4.

The signals 540 are input into the following components: the position select multiplexer (mux) 550, the crossing detector 556, and the crossing point latches 570, and the non-inverse of the signals 540 are also input into the peak detectors 576. The crossing detector 556 detects the crossing point events from among the signals 540. The crossing point events signals 558 are used by the quadrature state machine 560 and the crossing point latches 570. The quadrature state machine 560 calculates the quadrature value of the signal 542 that corresponds to signal 114 of FIG. 1 while the crossing point latches 570 determine the signals 122, 130, 138, and 144 of FIG. 1, which correspond to the signals 572.

The peak detectors 576 track the minimum and maximum values from the signals 540, outputting the peak values as the signals 574, which can be directly externally accessed. The quadrature decoder state machine 560 receives the crossing point event signals 558, and determines the value for the quadrature state signals 542 and the direction in which the digital quadrature signals 542 are moving, based, for instance, in the order in which the quadrature states 118 of FIG. 1 are being transitioned from one state to another. The state machine 560 indicates this direction via the signal 564, and outputs the values of the quadrature signals as the signal 542, which can correspond to the signal 114 of FIG. 1. The quadrature mechanism 404 of FIG. 4 can be considered to include the crossing detector 556, the crossing point latches 570, the peak detectors 576, and the quadrature decode state machine 560 as depicted in FIG. 4.

The position counter 566 maintains a position value based at least on the direction of the quadrature signals 558, as indicated by the signal 564 from the state machine 560. The position counter 566 outputs a signal 554 representing this position value. The position counter 566 can be considered to be a part of the counting mechanism 406 of FIG. 4 in one embodiment and can be considered similar to the signal 116 of FIG. 1.

The position select mux 550 selects one of the signals 540, whereas the crossing select mux 578 selects a pair of the signals 572, and outputs this pair as the signals 580. The signals 572 can correspond to the signals 122, 130, 138, and 144 of FIG. 1 while the signal 554 can correspond to the signal 106 of FIG. 1. The register 582 is a synchronizing register, and stores the signals 552, the signals 554, the signals 542, and the signals 580. The contents of this register are updated using various trigger events and this function will allow the output values on signal 584 to be time synchronized. The muxes 550 and 578, and the register 582, can be considered to be a part of the register mechanism 408 of FIG. 4 in one embodiment of the invention.

Method

Figure 6:
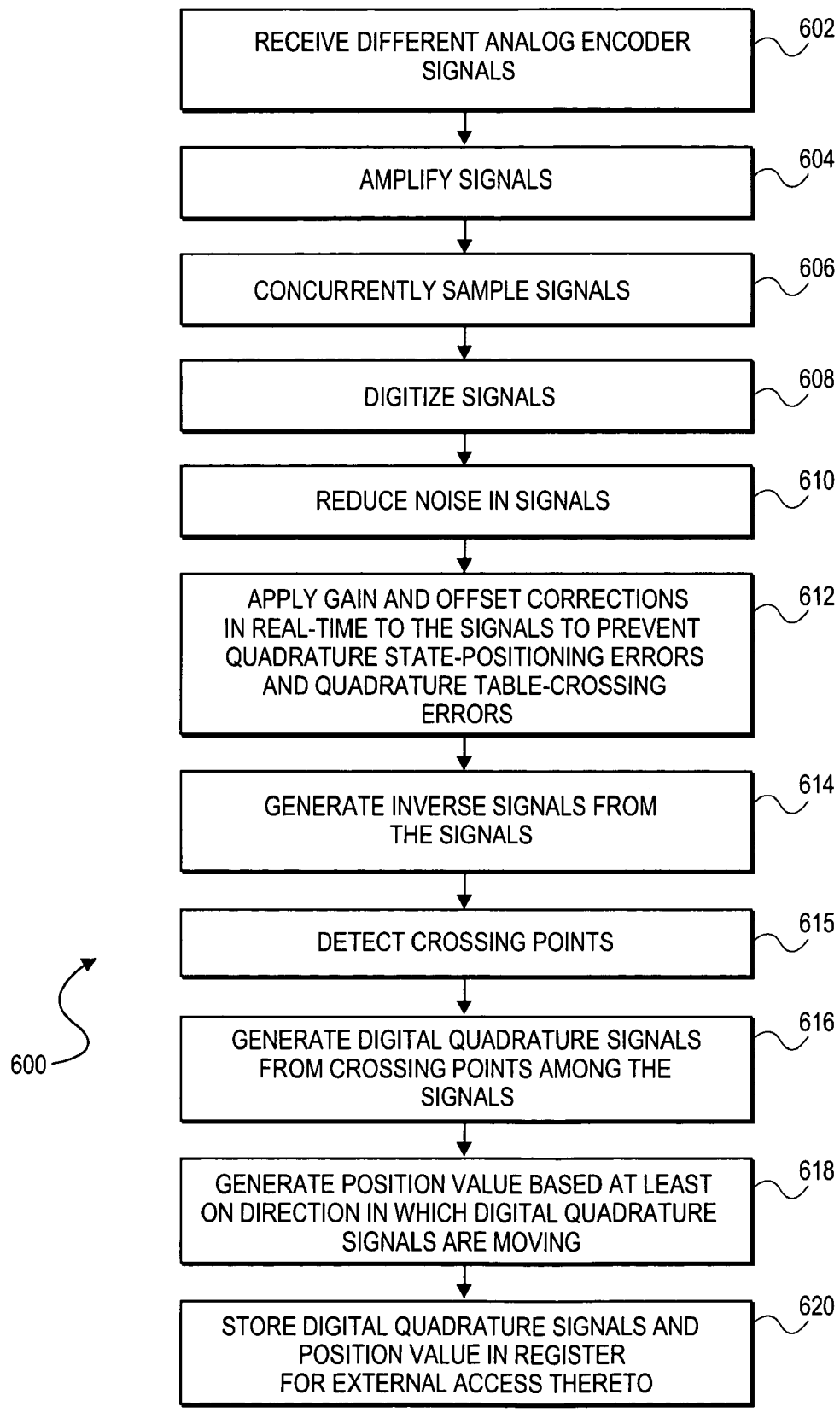
FIG. 6 is a flowchart of an example of a method for using the analog encoder of FIGS. 3, 4, and/or 5, according to an embodiment of the invention.

FIG. 6 shows an example of a method 600 for using the analog encoder 208 of FIGS. 3, 4, and/or 5, according to an embodiment of the invention. Different analog encoder signals are received (602). These signals may be the signals 102, 104 of FIG. 1, and correspond to the signals 308 of FIG. 4, inclusive of the signals 308A and 308B of FIG. 3, and to the signals 503A and 503B of FIG. 5. The signals are amplified in the analog domain (604), and concurrently sampled (606), prior to being digitized (608) and having noise therein reduced (610). Sampling may be accomplished by the mechanisms 522A and 522B in FIG. 5, digitizing may be accomplished by the converters 524A and 524B in FIG. 5, and noise reducing may be accomplished by the filters 526A and 526B in FIG. 5.

Gain and offset corrections are applied in real-time to reduce the likelihood of quadrature state-positioning errors and crossing detection errors (614). Offset and gain corrected signals are then used to create the inverse signals (612). Generation of the inverse signals and application of the gain and offset corrections may be accomplished by the digital signal processor (DSP) 534 of FIG. 5 of the DSP mechanism 304 of FIGS. 3 and 4. The gain and offset corrections are dynamically changeable and independently controllable. Crossing point detection is then performed (615), the output of which may correspond to the signals 558 of FIG. 5.

Digital quadrature signals are then generated from crossing points among the signals (616). A position value is further generated, based at least on the direction in which the digital quadrature signals are moving (618). Additionally the crossing point magnitude values may be latched and the peak magnitude values may be latched in this 616 function. Finally, the digital quadrature signals and the position value are stored in registers for external access thereto (620) along with any other desired values such as crossing point values and peak amplitude values. The register may be the register 582 of FIG. 5, as a part of the register mechanism 408 of FIG. 4 of the output mechanism 306 of FIG. 3.

CONCLUSION

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of the disclosed embodiments of the present invention. Therefore, it is manifestly intended that this invention be limited only by the claims and equivalents thereof.

We claim:

1. An analog encoder comprising:
    an input mechanism to receive and digitize different analog encoder signals;
    a digital signal processing mechanism to generate inverse analog encoder signals from the different analog encoder signals and to apply dynamically changeable gain and offset corrections in real-time;
    an output mechanism to generate digital quadrature signals from crossing points among the analog encoder signals and the inverse analog encoder signals and a position value based on a direction of the digital quadrature signals for external access; and
    a quadrature decoder state machine to determine a value of the digital quadrature signals.

2. The analog encoder of claim 1, wherein the input mechanism comprises an analog-to-digital mechanism to digitize the different analog encoder signals.

3. The analog encoder of claim 1, wherein the output mechanism comprises:
    a counting mechanism to maintain the position value based on a direction of quadrature states.

4. The analog encoder of claim 3, wherein the output mechanism further comprises a register mechanism to store at least the digital quadrature signals and the position value for external access.

5. An analog encoder comprising:
    means for receiving and digitizing different analog encoder signals;
    means for generating inverse analog encoder signals from the different analog encoder signals and for applying dynamically changeable gain and offset corrections in real-time to reduce quadrature state-positioning errors and to reduce quadrature table-crossing errors;
    means for generating digital quadrature signals from crossing points among the analog encoder signals and the inverse analog encoder signals and a position value based on a direction in which the digital quadrature signals are moving for external access; and
    a quadrature decoder state machine to determine a value of the digital quadrature signals.

6. An analog encoder comprising:
    an analog-to-digital mechanism to receive and digitize different analog encoder signals;
    a digital signal processing mechanism to generate inverse analog encoder signals from the different analog encoder signals digitized and to apply gain and offset corrections;
    a quadrature mechanism to generate digital quadrature signals from crossing points among the analog encoder signals and the inverse analog encoder signals and including a quadrature decoder state machine to determine a value of the digital quadrature signals;
    a counting mechanism to maintain a position value based on a direction of the digital quadrature signals; and,
    a register mechanism to store at least the digital quadrature signals and the position value for external access.

7. The analog encoder of claim 6, wherein the analog-to-digital mechanism comprises:
    a plurality of sample-and-hold mechanisms to concurrently sample the different analog encoder signals;
    a plurality of analog-to-digital converters to digitize the different analog encoder signals as sampled by the sample-and-hold mechanism; and,
    an encoder analog-to-digital state machine to control the sample-and-hold mechanisms and the analog-to-digital converters.

8. The analog encoder of claim 7, wherein the analog-to-digital mechanism further comprises:
    a plurality of analog amplifiers to amplify the different analog encoder signals prior to sampling; and,
    a moving average filter controlled by the encoder analog-to-digital state machine to reduce noise within the analog encoder signals as sampled and digitized.

9. The analog encoder of claim 6, wherein the digital signal processing mechanism comprises:
    a plurality of independently controlled and dynamically adjustable offset correction inputs corresponding to the analog encoder signals;
    a plurality of independently controlled and dynamically adjustable gain correction inputs corresponding to the analog encoder signals; and,
    a digital signal processor to apply the gain and offset corrections to the analog encoder signals based on the gain correction and the offset correction inputs, and to generate the inverse analog encoder signals.

10. The analog encoder of claim 6, wherein the quadrature mechanism further comprises:
    a crossing detector to detect crossing points among the analog encoder signals and the inverse analog encoder signals;
    a plurality of crossing point latches to store the crossing points detected; and, a plurality of peak detectors to determine maximum and minimum values of the analog encoder signals and the inverse analog encoder signals.

11. The analog encoder of claim 10, wherein the counting mechanism comprises a position counter to maintain a position value based on the direction of the digital quadrature signals.

12. The analog encoder of claim 10, wherein the register mechanism comprises:
- a position select multiplexer to select one of the analog encoder signals and the inverse analog encoder signals;
- a crossing select multiplexer to select a pair of the digital quadrature signals representing the crossing points among the analog encoder signals and the inverse analog encoder signals; and,
- a synchronized register to store at different times at least the one of the analog encoder signals and the inverse analog encoder signals selected, the pair of the digital quadrature signals selected, and the position value.

13. An analog encoder comprising:
- a plurality of sample-and-hold mechanisms to concurrently sample different analog encoder signals;
- a digital signal processor to generate inverse analog encoder signals from the analog encoder signals sampled;
- a crossing detector to detect crossing points among the analog encoder signals sampled and the inverse analog encoder signals generated;
- a plurality of crossing point latches to store the crossing points detected;
- a quadrature decoder state machine to determine a value of the digital quadrature signals;
- a position counter to maintain a position value based on a direction of the digital quadrature signals; and,
- a register to store at least the digital quadrature signals and the position value for external access.

14. A method comprising:
- digitizing different analog encoder signals;
- detecting crossing points from among the different analog encoder signals digitized;
- applying dynamically changeable gain and offset corrections in real-time to the different analog encoder signals digitized;
- generating inverse analog encoder signals from the different analog encoder signals;
- generating digital quadrature signals from the crossing points among the analog encoder signals and the inverse analog encoder signals for external access thereto;
- determining a value of the digital quadrature signals using a quadrature decoder state machine; and
- generating a position value based on a direction of the digital quadrature signals for external access thereto.

15. The method of claim 14, further comprising initially receiving the different analog encoder signals.

16. The method of claim 15, further comprising sampling concurrently the different analog encoder signals.

17. The method of claim 16, further comprising amplifying the different analog encoder signals and reducing noise within the analog encoder signals.

18. The method of claim 14, further comprising storing the digital quadrature signals generated.

19. The method of claim 14, further comprising determining peak positions from the analog encoder signals and the inverse analog encoder signals.

20. The method of claim 14, further comprising storing at least the digital quadrature signals and the position value within a register for external access thereto.

* * * * *